US012601359B2

(12) United States Patent
Rjabchenko et al.

(10) Patent No.: US 12,601,359 B2
(45) Date of Patent: **\*Apr. 14, 2026**

(54) SIDE CHANNEL COMPRESSOR HAVING A SEAL ASSEMBLY

(71) Applicant: Gardner Denver Deutschland GmbH, Bad Neustadt (DE)

(72) Inventors: Evgenij Rjabchenko, Salz (DE); Manuela Gans, Mittelstreu (DE)

(73) Assignee: Gardner Denver Deutschland GmbH, Bad Neustadt (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 18/983,610

(22) Filed: Dec. 17, 2024

(65) Prior Publication Data

US 2025/0334129 A1      Oct. 30, 2025

Related U.S. Application Data

(63) Continuation of application No. 18/515,940, filed on Nov. 21, 2023, now Pat. No. 12,180,972, which is a
(Continued)

(30) Foreign Application Priority Data

Nov. 15, 2016    (DE) ......................... 102016222430.1

(51) Int. Cl.
   *F04D 29/08*       (2006.01)
   *F04D 17/10*       (2006.01)
   (Continued)

(52) U.S. Cl.
   CPC ......... *F04D 29/083* (2013.01); *F04D 23/008* (2013.01); *F05D 2240/55* (2013.01); *F05D 2260/38* (2013.01); *F16J 15/3212* (2013.01)

(58) Field of Classification Search
   CPC ...... F04D 23/008; F04D 29/083; F04D 5/002; F16J 15/3212; F16J 15/441; F16J 15/3208; F16J 15/3268; F16J 9/063; F16J 9/066
   See application file for complete search history.

(56) References Cited

U.S. PATENT DOCUMENTS 2,111,258 A   *   3/1938   Zahodiakin .............. F16J 9/063
                                                              267/1.5
2,483,988 A       10/1949   Victor
                         (Continued)

FOREIGN PATENT DOCUMENTS

AT              81348 B      9/1920
DE             548634 C      4/1932
                         (Continued)

OTHER PUBLICATIONS

Examiner's Report for German Application No. 102016222430.1, dated Aug. 17, 2017.
(Continued)

*Primary Examiner* — Justin D Seabe
(74) *Attorney, Agent, or Firm* — Kevin E. West; Advent, LLP

(57)                ABSTRACT

A side channel compressor for compressing a gas includes a housing and at least one impeller which is arranged in the housing and configured to be driven in rotation about a central axis. In addition, the side channel compressor includes at least one seal assembly arranged in the housing and including at least one sealing device configured to seal at least one gap between the housing and the at least one impeller and be forced radially outward with respect to the central axis in order to keep the at least one gap small. The at least one seal assembly also includes at least one sealing-device-holding device configured to hold the at least one
(Continued)

Figure 1:
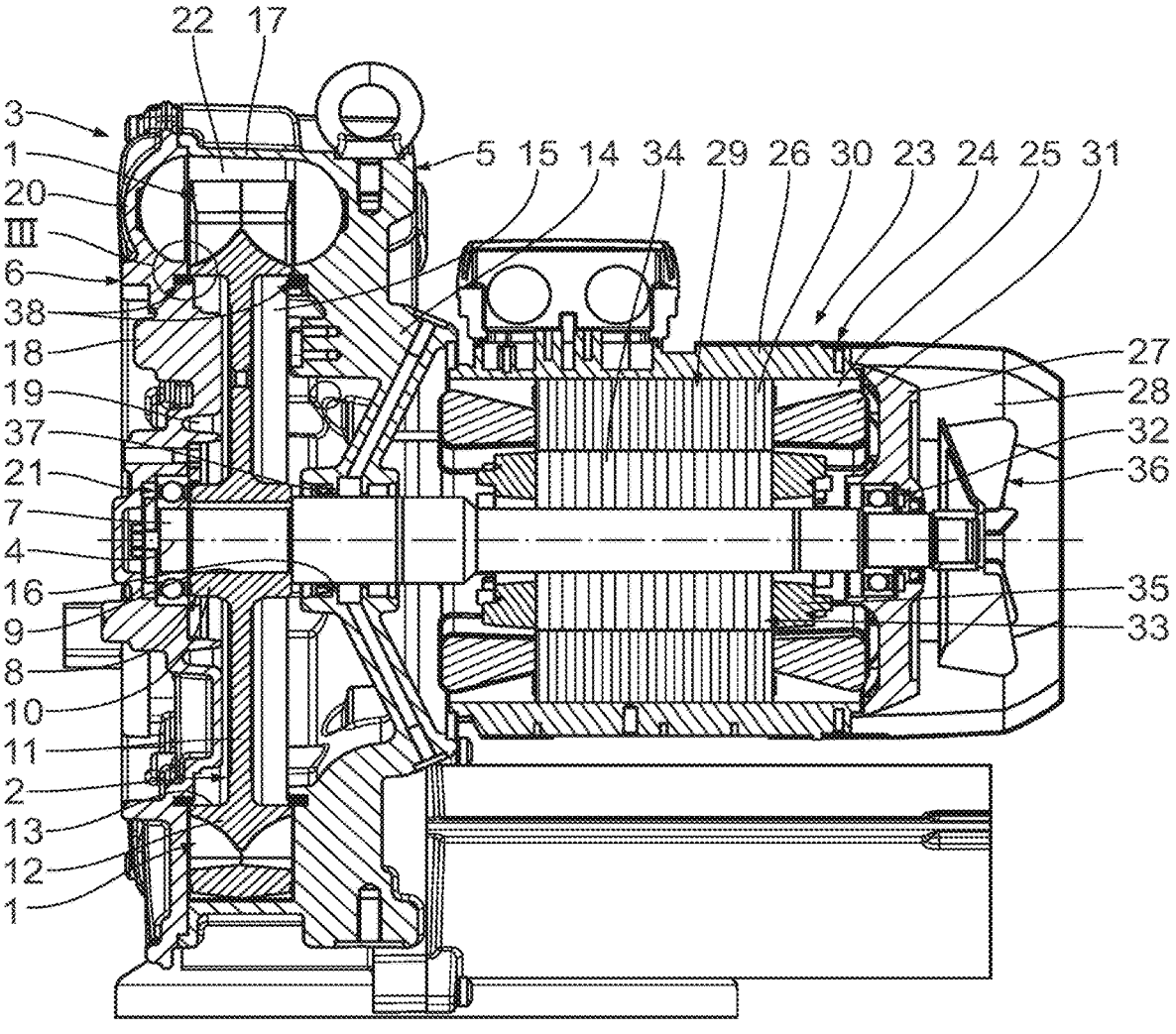

sealing device in an axially secured fashion with respect to the central axis and which includes at least one main holding body.

21 Claims, 7 Drawing Sheets

Related U.S. Application Data continuation of application No. 17/834,565, filed on Jun. 7, 2022, now Pat. No. 11,859,630, which is a continuation of application No. 16/487,044, filed as application No. PCT/EP2017/079013 on Nov. 13, 2017, now Pat. No. 11,353,037.

(51) Int. Cl.
        *F04D 23/00*            (2006.01)
        *F16J 15/3212*         (2016.01)

(56)                    References Cited

U.S. PATENT DOCUMENTS

| | | | | |
|---|---|---|---|---|
| 2,604,050 | A | 7/1952 | Wilson | |
| 4,145,060 | A * | 3/1979 | Stecher | F16J 9/203 |
| | | | | 277/477 |
| 4,323,253 | A | 4/1982 | Pomfret | |
| 5,658,126 | A | 8/1997 | Werner et al. | |
| 6,019,571 | A | 2/2000 | Fischer | |
| 2007/0020084 | A1* | 1/2007 | Krines | F04D 23/008 |
| | | | | 415/55.1 |
| 2007/0059154 | A1 | 3/2007 | Krines et al. | |

FOREIGN PATENT DOCUMENTS

| | | | |
|---|---|---|---|
| DE | 2244933 | A1 | 3/1974 |
| DE | 3201862 | A1 | 8/1982 |
| DE | 3201862 | C2 | 2/1983 |
| DE | 10041332 | C1 | 8/2001 |
| DE | 10317010 | A1 | 11/2004 |
| DE | 202004019071 | U1 | 4/2006 |
| DE | 202004019366 | U1 | 4/2006 |
| EP | 0708248 | A2 | 4/1996 |
| EP | 1672222 | A2 | 6/2006 |
| JP | S57103397 | U | 6/1982 |
| JP | S59128993 | A | 7/1984 |
| JP | 2000507322 | A | 6/2000 |
| WO | 9710439 | A1 | 3/1997 |
| WO | 2015020978 | A1 | 2/2015 |

OTHER PUBLICATIONS

Extended European Search Report for European Application No. 17801417.1, dated Jun. 27, 2019.
International Search Report for Application No. PCT/EP2017/079013, dated Feb. 13, 2018.
Office Action for Japanese Application No. 2019-524384, dated Aug. 31, 2021.
Office Action for European Application No. 17801417.1, dated Feb. 23, 2024.
Office Action for European Application No. 17801417.1, dated Jul. 17, 2023.
Office Action for Chinese Application No. 201780070531.dated Apr. 24, 2020.
Office Action for European Application No. 17801417.1, dated Apr. 14, 2020.
Search Report for European Application No. 20152808.0, dated Apr. 14, 2020.
Search Report for European Application No. 20152809.8, dated Apr. 14, 2020.
Written Opinion for International Application No. PCT/EP/2017/079013, dated Feb. 13, 2018.
Written Opinion for Singapore Application No. 112019043950, dated Jun. 18, 2020.

* cited by examiner

SIDE CHANNEL COMPRESSOR HAVING A SEAL ASSEMBLY

The present patent application is a continuation of U.S. patent application Ser. No. 18/515,940, filed on Nov. 21, 2023, and titled "SIDE CHANNEL COMPRESSOR HAVING A SEAL ASSEMBLY", which is a continuation of U.S. patent application Ser. No. 17/834,565, filed on Jun. 7, 2022, and titled "SIDE CHANNEL COMPRESSOR HAVING A SEAL ASSEMBLY", which is a continuation of U.S. patent application Ser. No. 16/487,044 filed on Aug. 19, 2019, which is a national stage entry of International Patent Application No. PCT/EP2017/079013, filed Nov. 13, 2017, which claims priority of German Patent Application No. DE 10 2016 222 430.1, filed Nov. 15, 2016. U.S. Patent Application No. U.S. Ser. No. 18/515,940, patent application Ser. No. 17/834,565, U.S. patent application Ser. No. 16/487,044, International Patent Application No. PCT/EP2017/079013, and German Patent Application No. DE 10 2016 222 430.1 are hereby incorporated by reference in their entireties.

The invention relates to a side channel compressor for compressing a gas such as air or a technical gas. The side channel compressor is embodied, for example, as a side channel fan.

Side channel compressors are generally known from the prior art. The efficiency level of a side channel compressor is dependent, inter alia, on the leakage current which occurs. In order to avoid such a leakage current, corresponding seal assemblies are used. It is disadvantageous that seal assemblies frequently experience wear over the service life of the side channel compressor, leading to a reduction in the efficiency level. In addition, the sealing effect of the seal assemblies is not always satisfactory.

The invention is based on the object of overcoming the disadvantages of the prior art. In particular, a side channel compressor having an efficiency level which is, in particular, sustained or extremely high over all the operating states is to be provided. In particular, leakage current is to be avoided in a sustained fashion or over all the operating states.

This object is achieved according to the invention by means of the features which are specified in claim 1. The core of the invention lies in the fact that the at least one sealing device avoids a leakage current which forms, for example, owing to prevailing pressure conditions across the at least one gap between the housing and the at least one impeller. The gap is therefore present between parts of the side channel compressor which rotate with respect to one another.

Since the at least one sealing device is forced, in particular pressed, radially outward, changes in volume which occur during the operation of the side channel compressor, in particular owing to temperature fluctuations, can be reliably compensated. Deformations, in particular thermally induced deformations, of the at least one sealing device are therefore not critical. The at least one sealing device is advantageously forced, in particular pressed, in a homogeneous or uniform fashion radially outward. The at least one remaining gap between the housing and the at least one impeller is therefore kept small for all operating states.

The at least one sealing-device-holding device prevents the at least one sealing device from migrating or shifting in the axial direction. The at least one sealing device is therefore secured against axial migration. Leakage currents or increased wear can therefore be avoided.

The at least one sealing device is preferably annular and advantageously has a radially outwardly facing sealing surface which extends adjacent to the at least one impeller, in particular with respect to the bearing ring base thereof and abuts there in a seal-forming fashion. It is advantageous if the at least one sealing device has, in the mounted state, an external diameter which corresponds to an internal diameter of the bearing ring.

The at least one sealing device is advantageously formed by at least one sealing strip or at least one sealing ribbon. The sealing device is preferably in one part. It is expedient if the at least one sealing device at least partially comprises Teflon and is more preferably composed of Teflon (polytetrafluoroethylene). Other corresponding materials can be used as alternatives.

The at least one seal assembly can advantageously be mounted and removed without tools.

According to one preferred embodiment, the at least one sealing device is itself elastic or resilient. It is therefore advantageously able to be forced, in particular pressed, radially outward. According to one advantageous embodiment, the at least one sealing device is foamed or formed from a foam material. According to one preferred embodiment, the at least one sealing device is forced, in particular pressed, radially outward by at least one adjacently arranged elastic forcing belt, which is advantageously also axially secured by means of the at least one sealing-device-holding device.

According to one preferred embodiment, the at least one sealing device is formed by lines which are intertwined, in particular interwoven.

It is advantageous if at least one side channel is formed in the housing. The housing also advantageously has at least one gas inlet opening for introducing the gas to be compressed into the at least one side channel. The housing preferably also has at least one gas outlet opening for carrying away the compressed gas from the at least one side channel. It is expedient if the housing is in two parts.

It is advantageous if the at least one impeller can be driven in rotation by means of a drive, in particular an electric drive.

Further advantageous refinements of the invention are specified in the dependent claims.

The at least one holding projection as claimed in dependent claim 3 prevents in a functionally reliable fashion a relative movement in the axial direction between the at least one sealing-device-holding device and the at least one sealing device. A multiplicity of holding projections are advantageously present.

The refinement as claimed in dependent claim 4 is particularly mounting-friendly. The at least one holding projection advantageously extends over just a part of the length of the sealing-device-holding device. Alternatively, the at least one holding projection engages in a holding fashion in the at least one sealing device.

The refinement as claimed in dependent claim 5 is also particularly mounting-friendly. Alternatively, the at least one holding projection projects radially inward with respect to the central axis from the at least one main holding body.

The refinement as claimed in dependent claim 6 gives rise to a seal assembly which requires an extremely small amount of space.

The seal assembly as claimed in dependent claim 7 is, on the one hand, able to be manufactured in an extremely cost-effective fashion. On the other hand, such a seal assembly is particularly functionally reliable.

The refinement as claimed in dependent claim 8 results in a seal assembly which particularly effectively prevents axial migration or shifting of the at least one seal device in relation to the housing or the at least one impeller.

It is expedient if the at least one sealing-device-holding device is supported on both sides on the housing, axially with respect to the central axis. The at least one sealing-device-holding device is advantageously supported on at least one shoulder, edge and/or side wall of the housing.

The refinement as claimed in dependent claim 9 brings about a situation in which the at least one sealing device is forced, in particular pressed, radially outward, and in this way the at least one gap always remains small. The spring stress is effective in the radial direction. The at least one spring projection is embodied in a sprung fashion. It is advantageous if a multiplicity of spring projections are present which are advantageously arranged equidistantly with respect to one another.

As claimed in dependent claim 11, the at least one spring projection projects radially inward with respect to the central axis from the at least one main holding body. Alternatively, said spring projection projects radially outward with respect to the central axis from the at least one main holding body.

The refinement as claimed in dependent claim 12 gives rise to a sealing-device-holding device which can be manufactured in a particularly cost-effective fashion and is functionally reliable. The at least one spring projection is therefore a bending part. It is expedient if the at least one sealing-device-holding device is formed from a metal material or a metal body.

The seal assembly as claimed in dependent claim 14 provides a particularly high seal-forming effect. The at least one holding projection and the at least one spring projection are advantageously arranged spaced axially apart from one another with respect to the central axis.

The at least one sealing-device-holding device as claimed in dependent claim 15 is able to be manufactured in a particularly cost-effective fashion and is functionally reliable. The at least one holding projection, the at least one spring projection and the at least one main holding body are therefore advantageously connected to one another in one part or one piece.

Figure 2:
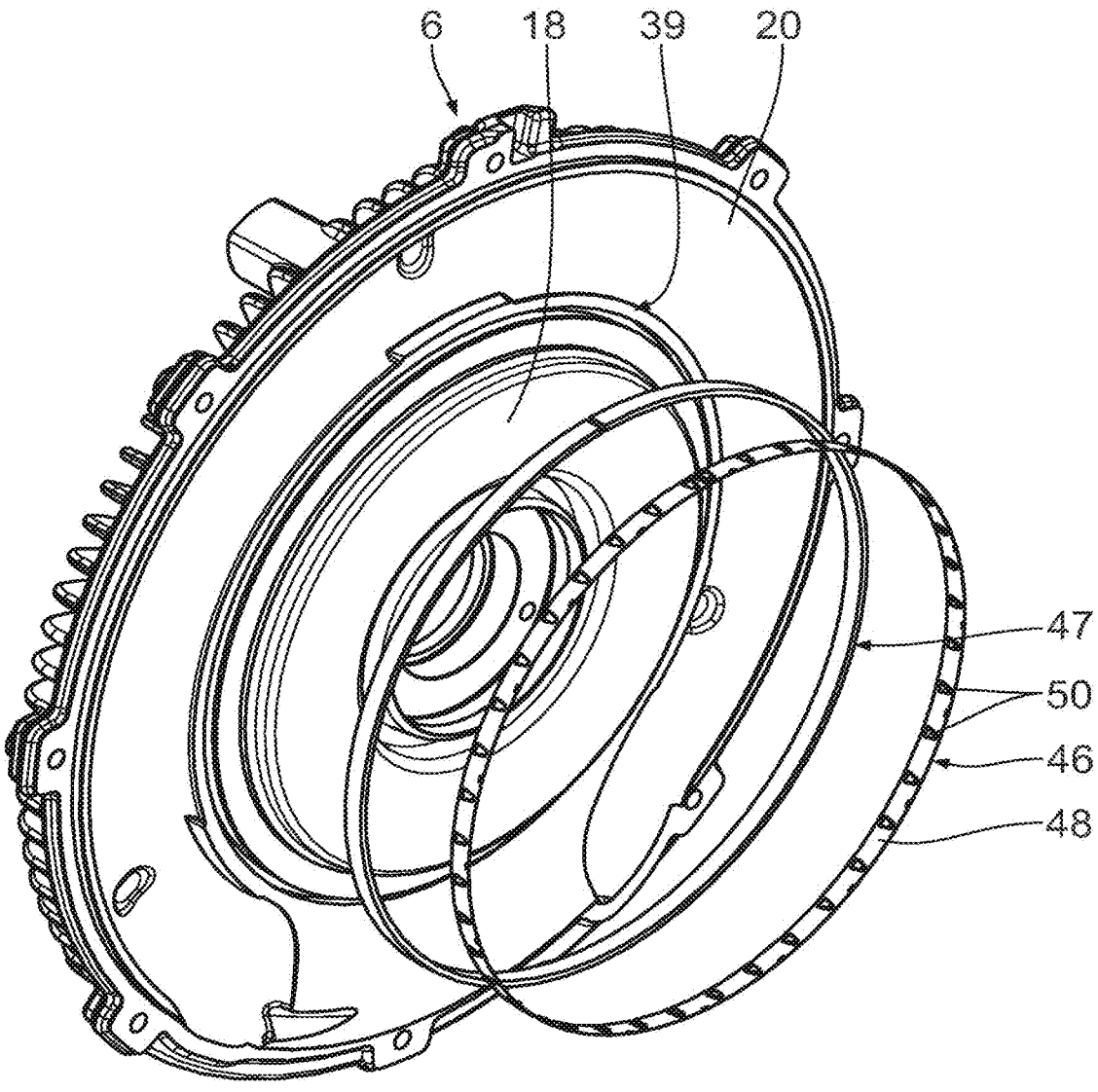
Figure 3:
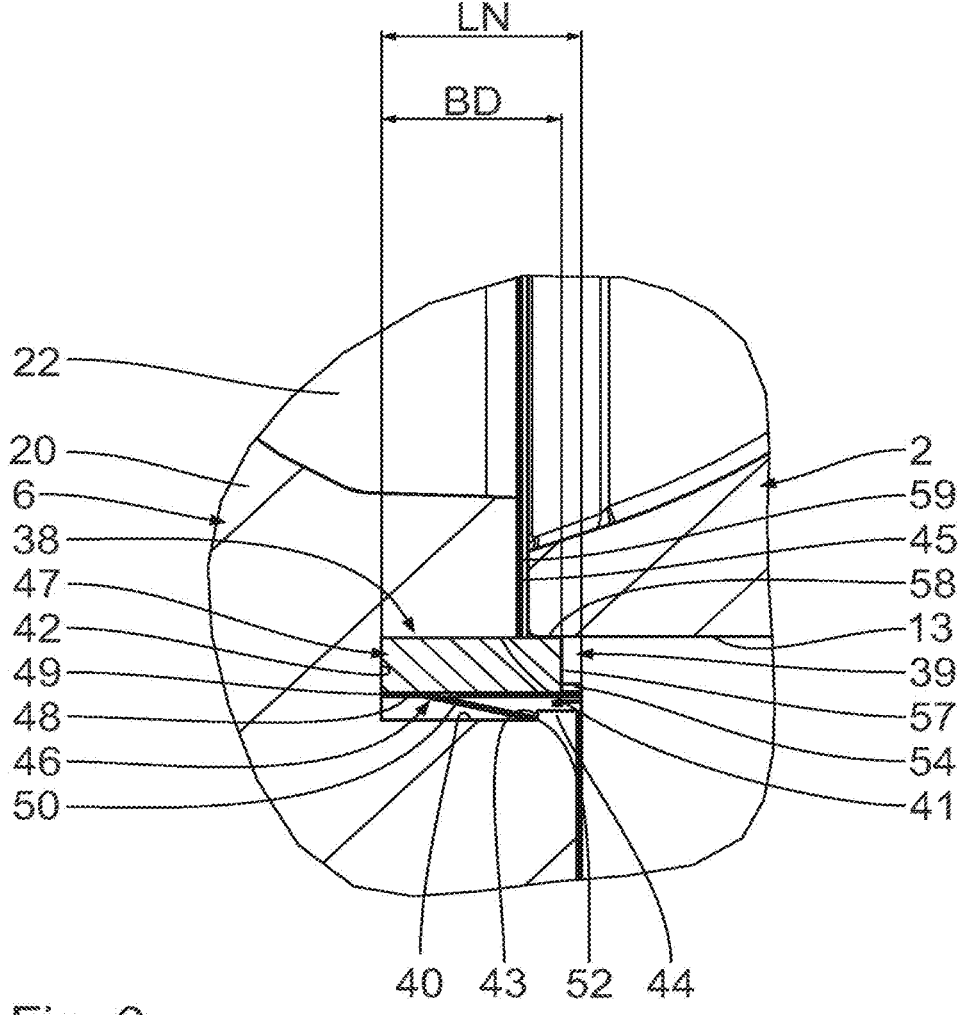
Figure 4:
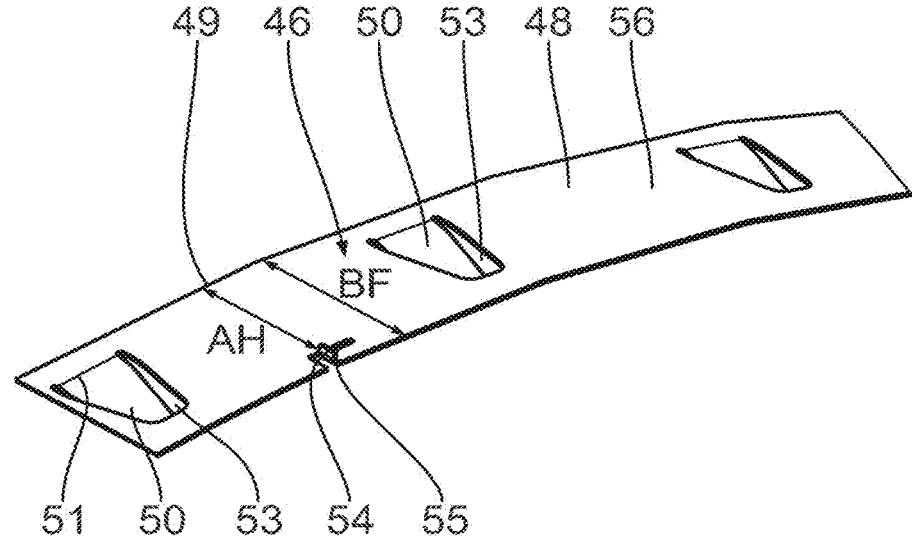
Figure 5:
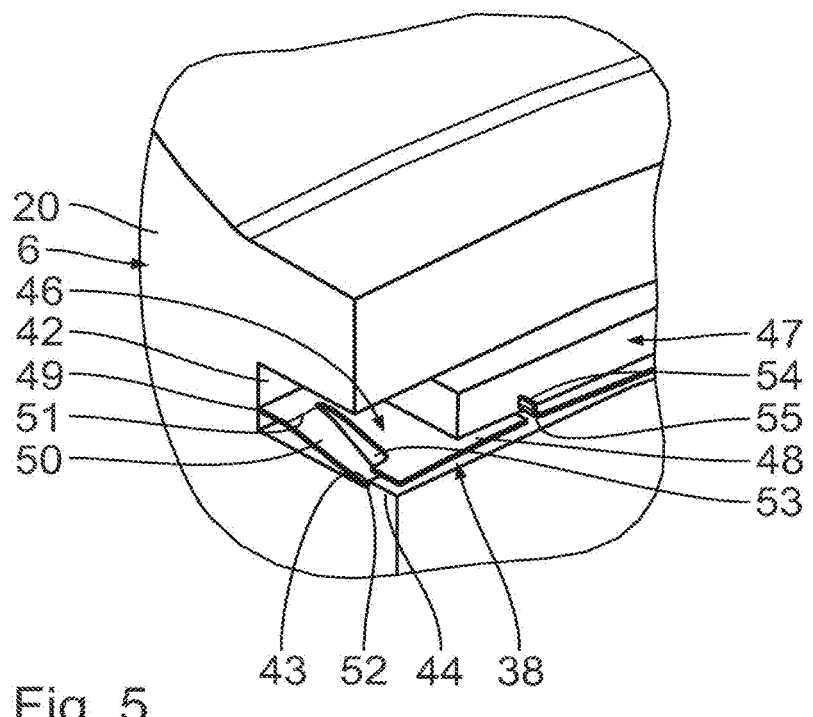
Figure 6:
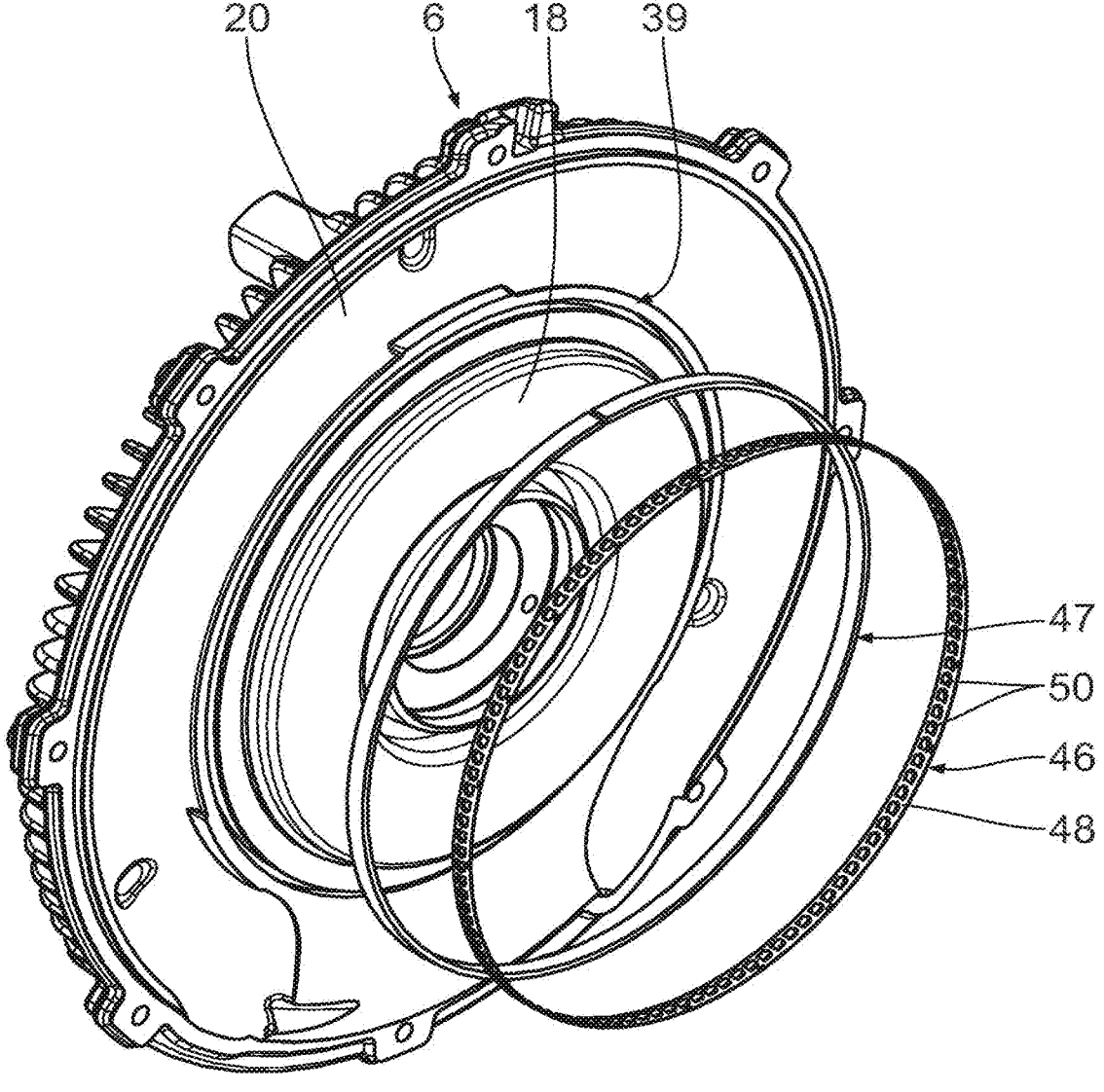
Figure 7:
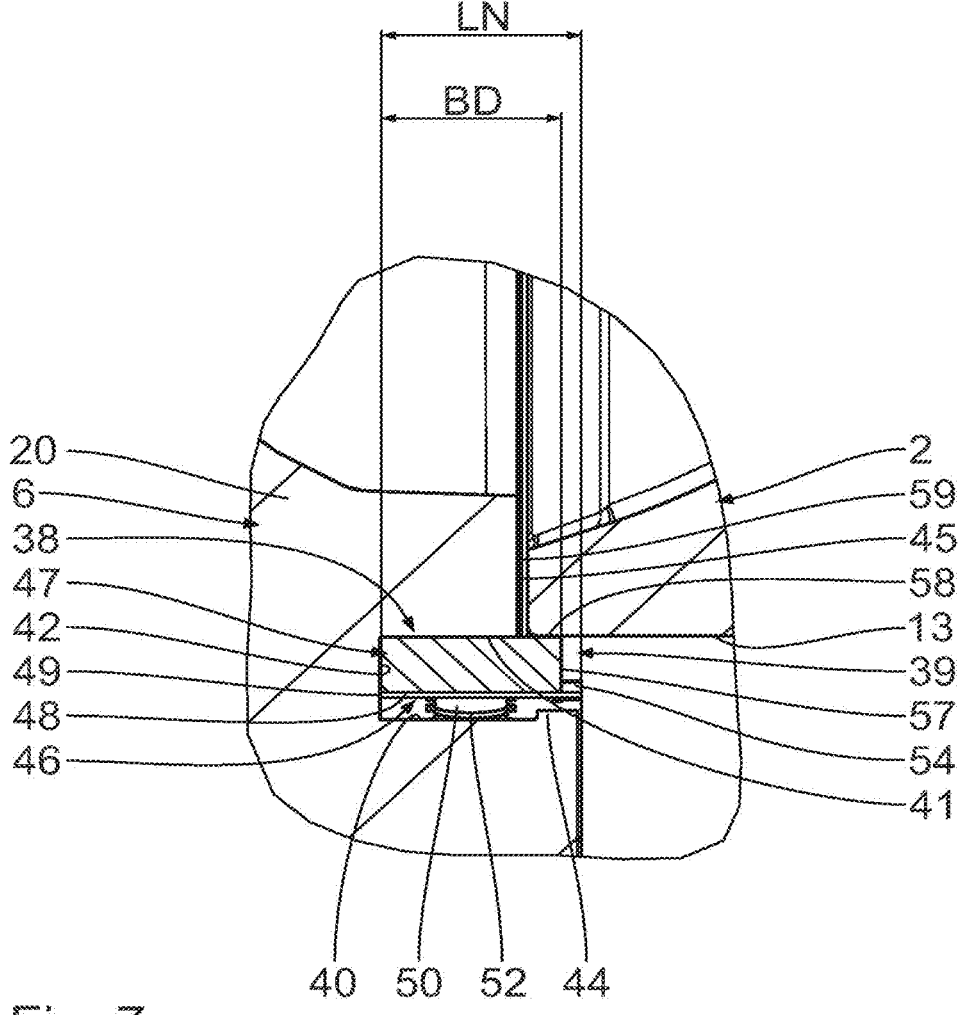
Figure 8:
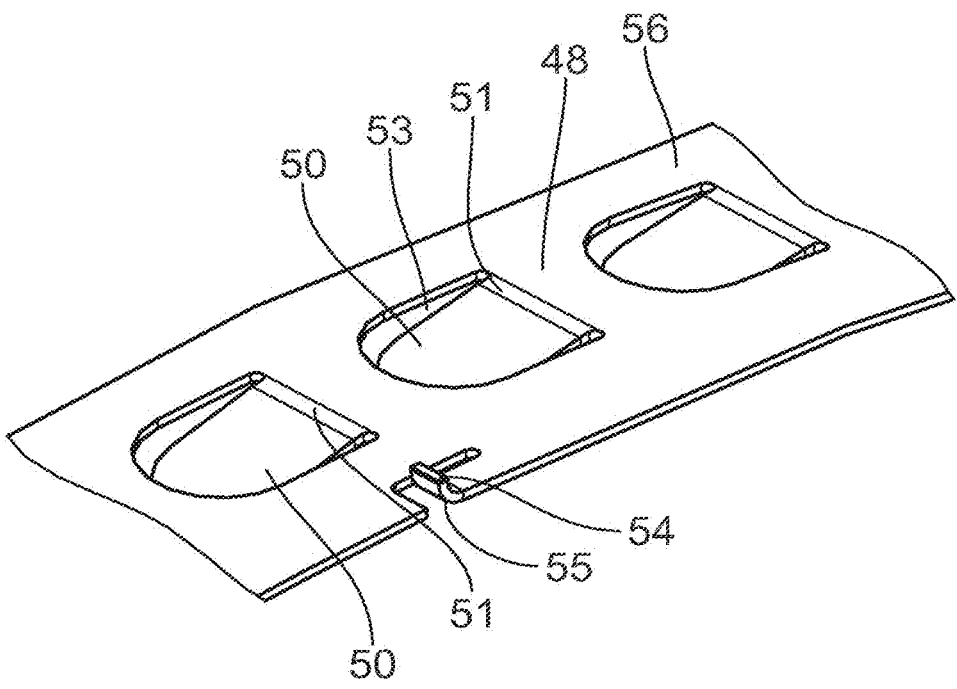
Figure 9:
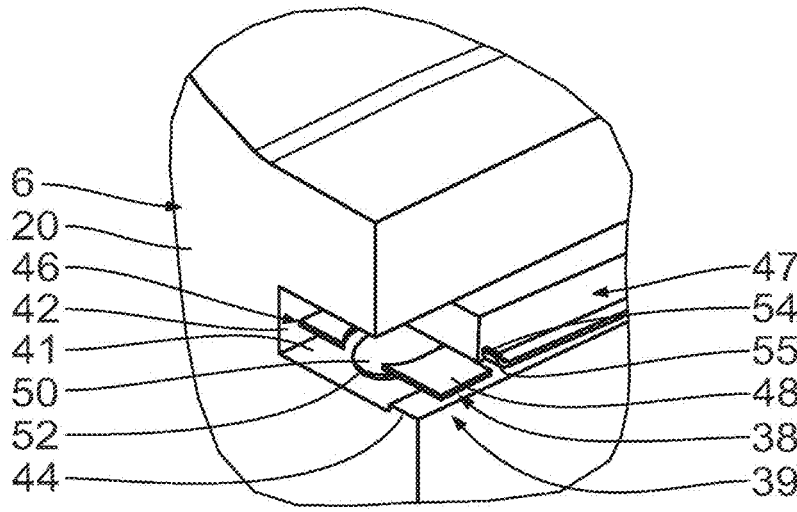

Two preferred embodiments of the invention are described by way of example below with reference to the appended drawing, in which:

FIG. 1 shows a longitudinal section through a side channel compressor according to the invention with a flanged-on drive, FIG. 2 shows an exploded view of a seal assembly and of a housing lid of the side channel compressor shown in FIG. 1, FIG. 3 shows the detail III indicated in FIG. 1, FIG. 4 shows an enlarged detail of the sealing-device-holding device of the side channel compressor illustrated in FIG. 1, FIG. 5 shows an enlarged perspective partial view showing the seal assembly of the side channel compressor according to FIG. 1 in the mounted state, FIG. 6 shows a view which corresponds to FIG. 2 and illustrates a second inventive embodiment of the seal assembly or of the side channel compressor, FIG. 7 shows an enlarged sectional view which shows the seal assembly according to FIG. 6 in the mounted state, corresponding to FIG. 3, FIG. 8 shows a perspective partial view of the sealing-device-holding device according to FIGS. 6 and 7, and FIG. 9 shows a perspective partial view of the seal assembly according to FIGS. 6 to 8 in the mounted state.

First, referring to FIG. 1 an assembled side channel compressor which is illustrated there in its entirety and has the purpose of compressing a gas comprises an impeller 2 which is provided with impeller blades 1 and is mounted such that it can be driven in rotation about a longitudinal central axis 4 in a housing 3 of the side channel compressor. The longitudinal central axis 4 therefore forms a rotational axis.

The housing 3 has a housing body 5 and a removable housing lid 6, which are aligned together according to FIG. 1 and together enclose the impeller 2 which is arranged in rotationally fixed fashion on a driveshaft 7 and has impeller blades 1.

The single-row impeller 2 is constructed in the manner of a disk. It has an impeller hub 8 with a central hub drilled hole 9. The impeller hub 8 is formed by an internal hub foot 10 which adjoins the hub drilled hole 9 radially outward, and a circular-ring-shaped hub disk 11 which adjoins said hub foot 10 and runs radially outward from there.

The impeller 2 also has a radially outer bearing ring 12 which adjoins the hub disk 11 radially on the outside and overlaps with it on both sides in the direction of the longitudinal central axis 4. The bearing ring 12 accordingly has a bearing ring base 13 facing the longitudinal central axis 4, and said bearing ring 12 has, distributed in a circumferential direction, a multiplicity of impeller blades 1 which are arranged equidistantly with respect to one another and project radially outward from the bearing ring 12. The hub foot 10, the hub disk 11 and the bearing ring 13 are embodied as a single-piece cast part.

The housing body 5 has a first hub section 14, which spatially bounds a first partial hub receptacle space 15. The first hub section 14 is penetrated by a central shaft drilled hole 16 which opens into the first partial hub receptacle space 15. A first side channel section 17 adjoins the first hub section 14 radially in the outward direction. The first hub section 14 and the first side channel section 17 are embodied as a single-piece cast part and form the housing body 5.

The housing lid 6 is screwed to the housing body 5 in the assembled state of the housing 3. Said housing lid 6 has a second hub section 18 which spatially bounds a second partial hub receptacle space 19. A second side channel section 20 adjoins the second hub section 18 in a radially outward direction. A roller bearing 21 for supporting the driveshaft 7 is arranged in the second hub section 18. The driveshaft 7 has at the end side a bearing pin which is rotatably mounted by the roller bearing 21. The second hub section 18 and the second side channel section 20 are embodied as a single-piece cast part and form the housing lid 6.

The housing body 5 and the housing lid 6 are connected to one another in such a way that the two partial hub receptacle spaces 15, 19 together bound a hub receptacle space, and the two side channel sections 17, 20 together spatially bound a side channel 22 for conducting or feeding a gas. The side channel 22 extends around the longitudinal central axis 4 in an annular shape, in a spaced-apart fashion.

A gas inlet opening, which opens into the side channel 22, is constructed in the housing 3. In addition, a gas outlet opening, which also has a flow connection to the side channel 22 and is arranged adjacent, but separately, with respect to the gas inlet opening, is constructed in the housing 3. An interrupter is arranged in the side channel 22, between the gas inlet opening and the gas outlet opening.

In the hub receptacle space there are the hub foot 10 and the hub disk 11 of the impeller 2, wherein the hub drilled hole 9 is penetrated by the driveshaft 7. The impeller blades 1 are located in the side channel 22.

In order to drive the impeller 2 in rotation in the circumferential direction, a conventional drive 23 is used which is embodied as an electric drive. The drive 23 is flanged onto the housing body 5 and has a drive housing 24 which spatially bounds a drive interior 25. The drive housing 24 has a casing body 26 and an end plate 27 which is attached to the end side thereof, and a radiator cover 28.

Accommodated in the drive interior 25 is a drive stator 29 which in turn comprises a stator laminated core 30 which is attached to the inside of the casing body 26, and a stator winding 31. The stator winding 31 comprises a plurality of coils which are directly connected to the stator laminated core 30. A second roller bearing 32, which rotatably supports the driveshaft 7, is accommodated in the end plate 27. In the drive interior 25 there is also a rotor 33 which is arranged in a rotationally fixed fashion on the driveshaft 7 and runs within the drive stator 29. The rotor 33 comprises a rotor laminated core 34 and rotor rods 35.

A drive radiator wheel 36 is arranged in a rotationally fixed fashion on an end section, guided through the end plate 27, of the driveshaft 27. The radiator lid 28 surrounds the drive radiator wheel 36.

The drive 23 operates in a conventional, generally known fashion. In the case of connection to the power grid, the stator winding 31 has a current flowing through it, as a result of which a magnetic field is produced in the drive stator 29. The drive stator 29 thus interacts with the rotor 33. The rotor 33, and therefore also the driveshaft 7, are then set in rotation about the longitudinal central axis 4.

For reasons of tightness, a driveshaft seal 37 is arranged in the housing body 5, which driveshaft seal 37 rests in a seal-forming fashion on the outside of the driveshaft 7 and avoids a leakage current there.

In addition, a seal assembly 38 is arranged both in housing body 5 and in the housing lid 6. These seal assemblies 38 are of identical design.

In order to accommodate the seal assemblies 38, an annular groove 39 is respectively formed in the housing body 5 and in the housing lid 6, which annular grooves 39 are each spatially bounded by a radially inner internal edge 40 and a radially outer external edge 41 which lies opposite the respective internal edge 40, and a base edge 42 which connects the respective internal edge 40 and external edge 41. The internal edges 40 are at a shorter distance from the longitudinal central axis 4 than the external edges 41. They run parallel and concentrically with respect to the external edges 41. The base edges 42 run perpendicularly with respect to the adjacent internal edge 40 and external edge 41. The annular grooves 39 run at a constant distance around the longitudinal central axis 4 and are open toward the hub receptacle space.

Adjacent to each hub receptacle space, each internal edge 40 has a top surface which is formed on an annular web 44 which projects radially outward to form a retaining edge 43. Each retaining edge 43 runs in an annular shape around the longitudinal central axis 4 and faces the adjacent base edge 42 of the respective annular groove 39. Each retaining edge 43 runs parallel to the adjacent base edge 42 of the respective annular groove 39. It has a radial height which is substantially smaller than the corresponding radial height of a base edge 42.

Between each annular groove 39 and the side channel 22, the housing body 5 and the housing lid 6 have in each case a receptacle cutout 45, so that the internal edges 40 are longer in the direction of the longitudinal central axis 4 and wider than the external edges 41. The bearing ring 12 engages in the receptacle cutouts 45.

Each seal assembly 38 comprises a sealing-device-holding device 46 which is arranged adjacent to the respective internal edge 40, and a sealing strip 47 which abuts radially against the outside of the respective sealing-device-holding device 46.

Each sealing-device-holding device 46 has an annular, ribbon-shaped main holding body 48 which runs at a constant distance around the longitudinal central axis 4 and has an axial width BF in the direction of the longitudinal central axis 4, which axial width BF corresponds approximately to an axial length or width LN of an internal edge 40 in the direction of the longitudinal central axis 4. Each main holding body 48 has as an inner abutment edge 49 which abuts against the respective base edge 42.

In addition, each sealing-device-holding device 46 has a multiplicity of tab-like spring projections 50 which are each bent out in the direction of the longitudinal central axis 4 to form a bending line 51 running parallel to the abutment edge 49. The bending lines 51 run spaced apart from the abutment edge 49. The spring projections 50 extend here obliquely or in a curved fashion with respect to the main holding body 48. Starting from the respective bending line 51, they run away from the adjacent abutment edge 49. Each spring projection 50 has a free end 52 which abuts in a supporting fashion against the respective retaining edge 43 and internal edge 40. As a result of the bending of the spring projections 50 out of the respective main holding body 48, a multiplicity of bent-out openings 53 are formed therein and are closed on the circumferential side.

In addition, a multiplicity of holding projections 54 project radially outward from each main holding body 48 and are arranged opposite the abutment edge 49 and are bent out of the main holding body 48 to form respective bending lines 55. The bending lines 55 run parallel to the longitudinal central axis 4. An axial distance AH between the holding projections 54 and the abutment edge 49 of the sealing-device-holding device 46 corresponds to an axial width BD of a sealing strip 47.

Each sealing strip 47 abuts radially on the outside of the assigned main holding body 48, which therefore has a bearing surface 56 for the respective sealing strip 47. The sealing strips 47 cover the bent-out openings 53. The holding projections 54 abut against a side edge 57 of the respective sealing strip 47, which side edge 57 faces away from the adjacent base edge 42 or faces the hub receptacle space. Each sealing strip 47 abuts against the associated base edge 42 and abuts against the adjacent external edge 41.

Each sealing strip 47 projects axially in the direction of the longitudinal central axis 4 with respect to the adjacent external edge 41 to form a free sealing region 58. The sealing regions 58 abut in a seal-forming fashion against the bearing ring base 13 radially on the inside with respect to the longitudinal central axis 4.

During the operation of the side channel compressor, the impeller 2 moves over the sealing strips 47, in particular over the free sealing regions 58. Each sealing strip 47 overlaps a gap 59 between the bearing ring 12 and the housing body 5 or housing lid 6. Each sealing strip 47 engages behind the adjacent bearing ring base 13.

Each sealing-device-holding device 46 is secured on both sides axially with respect to the longitudinal central axis 4. This is achieved by means of the simultaneous abutment of the abutment edge 49 against the adjacent base edge 42 and the housing 3 and by the abutment of the spring projections 50 against the adjacent retaining edge 43 or the housing 3.

Each sealing strip 47 is secured on both sides axially with respect to the longitudinal central axis 4. This is achieved by means of the simultaneous abutment of the respective sealing strip 47 against the adjacent base edge 42 or the housing 3 and against the holding projections 54.

Each sealing strip 47 is pressed radially outward in a sprung fashion by the spring projections 50 which are supported with respect to the internal edges 40. The generated spring stress is elastic. Each sealing-device-holding device 46 continually transmits a radially outwardly directed spring stress to the adjacent sealing strip 47 and in this way also ensures, if appropriate, that there is automatic spatial adjustment thereof in the radially outward direction, with the result that wear or deformations of the respective sealing strip 47 are automatically compensated. The sealing strips 47 are pressed against the external edges 41 and the bearing ring base 13.

A second embodiment is described below with reference to FIGS. 6 to 9. In contrast to the previous embodiment, to the description of which reference is explicitly made herewith, the spring projections 50 are bent out of the main holding body 48 here to form bending lines 51 which extend parallel to the longitudinal central axis 4. Otherwise, there are no significant differences.

The expressions "radially", "axially" or the like which are used refer, in particular, to the longitudinal central axis 4.

The invention claimed is:

1. A side channel compressor for compressing a gas, the compressor comprising:
    a housing having an annular groove and a hub receptacle space, the annular groove defining an internal edge relative to a central axis of the compressor, and an annular web adjacent to the hub receptacle space and extending into the annular groove, the annular web defining a retaining edge; and
    a seal assembly disposed in the annular groove, the seal assembly including:
    a sealing device, and
    a sealing-device-holding device configured to hold the sealing device, and which includes a main holding body,
    wherein the sealing-device-holding device has at least one of an oblique projection or a curved projection bent out of the main holding body, the oblique projection or curved projection having a free end abutting against at least one of the internal edge or the retaining edge, and projecting radially with respect to the central axis from the main holding body and supported in relation to the housing, forcing the sealing device radially outward with respect to the central axis and in contact with the impeller.

2. The side channel compressor as claimed in claim 1, wherein the sealing-device-holding device and the sealing device are axially immovable, in the mounted state, in relation to one another with respect to the central axis.

3. The side channel compressor as claimed in claim 1, wherein the sealing-device-holding device has a holding projection which projects radially with respect to the central axis from the main holding body and engages in a holding fashion on the sealing device.

4. The side channel compressor as claimed in claim 3 wherein the holding projection engages laterally on the outside of the sealing device.

5. The side channel compressor as claimed in claim 3, wherein the holding projection projects radially outward with respect to the central axis from the main holding body.

6. The side channel compressor as claimed in claim 3, wherein the holding projection is arranged on the edge of the main holding body.

7. The side channel compressor as claimed in claim 3, wherein the holding projection and the oblique projection or curved projection project radially in opposite directions from the main holding body.

8. The side channel compressor as claimed in claim 1, wherein the sealing-device-holding device is axially immovable with respect to the central axis in relation to the housing.

9. The side channel compressor as claimed in claim 1, wherein the oblique projection or curved projection is constructed in the manner of a tab.

10. The side channel compressor as claimed in claim 1, wherein the oblique projection or curved projection projects radially inward with respect to the central axis from the main holding body.

11. The side channel compressor as claimed in claim 1, wherein the at least one projection is arranged in a spaced-apart fashion on the edge of the main holding body.

12. The side channel compressor as claimed in claim 1, wherein the sealing-device-holding device is embodied in one part.

13. A seal assembly for a side-channel compressor comprising:
    a sealing device disposed in an annular groove of a compressor housing, the compressor housing including a hub receptacle space, the sealing device configured to seal a gap between the compressor housing and an impeller, the annular groove defining an internal edge relative to a central axis of the compressor, and having an annular web adjacent to the hub receptacle space, the annular web extending into the annular groove and defining a retaining edge, where the sealing device is configured to be forced radially outward with respect to the central axis to seal the gap, and
    a sealing-device-holding device configured to hold the sealing, and which includes a main holding body,
    wherein the sealing-device-holding device has at least one of an oblique projection or a curved projection bent out from the main holding body, the oblique projection or curved projection having a free end abutting against at least one of the internal edge or the retaining edge, and projecting radially with respect to the central axis from the main holding body and supported in relation to the housing, forcing the sealing device radially outward with respect to the central axis and in contact with the impeller.

14. The seal assembly as claimed in claim 13, wherein the sealing-device-holding device and the sealing device are axially immovable, in the mounted state, in relation to one another with respect to the central axis.

15. The seal assembly as claimed in claim 13, wherein the sealing-device-holding device has a holding projection which projects radially with respect to the central axis from the main holding body and engages with the sealing device.

16. The seal assembly as claimed in claim 13, wherein the holding projection engages laterally on the outside of the sealing device.

17. The seal assembly as claimed in claim 13, wherein the holding projection projects radially outward with respect to the central axis from the main holding body.

18. The seal assembly as claimed in claim 13, wherein the holding projection is arranged on the edge of the main holding body.

19. The seal assembly as claimed in claim 13, wherein the holding projection is bent out from the main holding body.

20. The seal assembly as claimed in claim 13, wherein the oblique projection or the curved projection bent out from the main holding body forms an opening in the main body.

21. The seal assembly as claimed in claim 20, wherein the sealing device covers the opening in the main body.

\* \* \* \* \*